(12) United States Patent
Keskikangas et al.

(10) Patent No.: US 12,335,483 B2
(45) Date of Patent: Jun. 17, 2025

(54) CAMERA SYSTEM AND METHOD FOR ENCODING TWO VIDEO IMAGE FRAMES CAPTURED BY A RESPECTIVE ONE OF TWO IMAGE SENSORS

(71) Applicant: Axis AB, Lund (SE)

(72) Inventors: Axel Keskikangas, Lund (SE); Song Yuan, Lund (SE); Viktor Edpalm, Lund (SE)

(73) Assignee: AXIS AB, Lund (SE)

( * ) Notice: Subject to any disclaimer, the term of this patent is extended or adjusted under 35 U.S.C. 154(b) by 204 days.

(21) Appl. No.: 18/327,341

(22) Filed: Jun. 1, 2023

(65) Prior Publication Data

US 2023/0412815 A1 Dec. 21, 2023

(30) Foreign Application Priority Data

Jun. 16, 2022 (EP) .................................... 22179338

(51) Int. Cl.
*H04N 19/136* (2014.01)
*H04N 19/167* (2014.01)
(Continued)

(52) U.S. Cl.
CPC ......... *H04N 19/136* (2014.11); *H04N 19/167* (2014.11); *H04N 19/172* (2014.11); *H04N 19/176* (2014.11); *H04N 23/80* (2023.01)

(58) Field of Classification Search
CPC .... H04N 19/172; H04N 19/136; H04N 19/17; H04N 19/176; H04N 19/124; H04N 19/597; H04N 19/167; H04N 23/80
(Continued)

(56) References Cited

U.S. PATENT DOCUMENTS 8,774,272 B1 * 7/2014 Chen .................... H04N 19/149
375/240.12
9,355,433 B1 * 5/2016 Adsumilli ................. G06T 3/18
(Continued)

FOREIGN PATENT DOCUMENTS

| JP | 2001-119625 A | 4/2001 |
| WO | 2017/125639 A1 | 7/2017 |

OTHER PUBLICATIONS

Partial European Search Report dated Dec. 14, 2022 for European Patent Application No. 22179338.3.
(Continued)

*Primary Examiner* — Pritham D Prabhakher
(74) *Attorney, Agent, or Firm* — Volpe Koenig

(57) ABSTRACT

An image processing device, a camera system, a non-transitory computer-readable storage medium, and methods for encoding two video image frames captured by one of two image sensors, wherein each of the video image frames depicts a respective portion of a scene. A respective overlapping area is identified in each of the video image frames, which overlapping areas both depict a same sub-portion of the scene, and a video image frame of the video image frames is selected. Compression levels are then set for the image frames, wherein respective compression levels are set for pixel blocks in the selected video image frame based on a given principle. Respective compression levels for pixel blocks in the overlapping area in the selected video image frame are selectively set higher or lower than respective compression levels that would have been set based on the given principle. The video image frames are then encoded.

13 Claims, 4 Drawing Sheets

(51) Int. Cl.
*H04N 19/172* (2014.01)
*H04N 19/176* (2014.01)
*H04N 23/80* (2023.01)

(58) Field of Classification Search
USPC ...................................................... 348/218.1
See application file for complete search history.

(56) References Cited

U.S. PATENT DOCUMENTS

| | | | |
|---|---|---|---|
| 9,478,008 B1 | 10/2016 | Adsumilli et al. | |
| 10,404,926 B2* | 9/2019 | Douady-Pleven | ... H04N 19/423 |
| 10,499,085 B1* | 12/2019 | Douady-Pleven | ........ G06T 3/18 |
| 10,595,069 B2 | 3/2020 | Swaminathan et al. | |
| 11,019,263 B2 | 5/2021 | Baran et al. | |
| 11,064,116 B2* | 7/2021 | Adsumilli | ............ H04N 23/698 |
| 11,410,387 B1* | 8/2022 | Alderman | ................ G06T 17/20 |
| 11,496,671 B2* | 11/2022 | Xiong | .................... H04N 7/181 |
| 11,611,699 B2* | 3/2023 | Adsumilli | .............. H04N 23/90 |
| 2008/0129844 A1 | 6/2008 | Cusack et al. | |
| 2017/0347044 A1* | 11/2017 | Douady-Pleven | ... H04N 19/503 |
| 2018/0160160 A1* | 6/2018 | Swaminathan | ...... H04N 21/816 |
| 2019/0230337 A1 | 7/2019 | Kim | |
| 2019/0297283 A1* | 9/2019 | Douady | ................. H04N 19/85 |
| 2020/0177939 A1* | 6/2020 | Swaminathan | .... H04N 21/2662 |
| 2020/0244883 A1* | 7/2020 | Baran | .................... H04N 23/45 |
| 2021/0152848 A1 | 5/2021 | Mizuno | |
| 2021/0192796 A1* | 6/2021 | Aflaki Beni | .............. G06T 9/40 |
| 2021/0233313 A1* | 7/2021 | Noris | .................... G06T 19/006 |
| 2021/0235117 A1* | 7/2021 | Malamal Vadakital | ..................... H04N 19/59 |
| 2022/0070371 A1* | 3/2022 | Bushman | ............. H04N 23/611 |
| 2022/0272255 A1* | 8/2022 | Xiong | ................... H04N 23/695 |

OTHER PUBLICATIONS

Extended European Search Report dated Jan. 11, 2023 for European Patent Application No. 22179338.3.

* cited by examiner

CAMERA SYSTEM AND METHOD FOR ENCODING TWO VIDEO IMAGE FRAMES CAPTURED BY A RESPECTIVE ONE OF TWO IMAGE SENSORS

TECHNICAL FIELD

The present invention relates to encoding video image frames captured by a respective one of two image sensors, and specifically to adapting compression level in an overlapping area between video image frames captured by the two image sensors.

BACKGROUND

When transferring and/or storing video image frames, it is of interest to limit the number of bits to be stored and/or transferred and to provide a desired quality for each portion of the video image frames. This is for example achieved by means of compression when encoding the video image frames in an image processing device comprising an encoder. If video image frames are captured by a respective one of two or more image sensors, the amount of data to be transmitted and/or stored becomes even larger and the desire to limit the amount of data becomes even more desirable.

SUMMARY

An object of the present invention is to facilitate a reduction of number of bits of encoded video image frames captured by a respective one of two or more image sensors. Another object of the present invention is to facilitate provision of a desired quality for each portion of the video image frames encoded video image frames captured by a respective one of two or more image sensors.

According to a first aspect, a method for encoding two video image frames captured by a respective one of two image sensors is provided, wherein each of the two video image frames depicts a respective portion of a scene. The method of the first aspect comprises identifying a respective overlapping area in each of the two video image frames, which overlapping areas both depict a same sub-portion of the scene, and selecting a video image frame of the two video image frames. The method of the first aspect further comprises setting compression levels for the two image frames, wherein respective compression levels are set for pixel blocks in the selected video image frame based on a given principle, and wherein respective compression levels for pixel blocks in the overlapping area in the selected video image frame are selectively set higher than respective compression levels that would have been set based on the given principle. The method of the first aspect further comprises encoding the two video image frames.

By depicting a same sub-portion of the scene is meant that the overlapping areas are each a two-dimensional representation of the same three-dimensional sub-portion of the scene. This does not necessarily mean that the overlapping areas of the two video image frames are identical since the two sensors can be positioned at an angle to each other and/or the two video image frames may have been subjected to different projection transformations.

By a compression level is meant a value indicating a level of compression such that the higher the compression level, the higher the level of compression.

The inventors have realized that if each of two video image frames comprises a respective overlapping area, wherein the overlapping areas both depict a same sub-portion of the scene, the number of bits of encoded versions of the two video image frames can be limited by increasing the compression level set for pixel blocks in the overlapping area of a selected one of the two video image frames. At the same time, since the compression level is selectively increased for pixel blocks in the overlapping area in the selected video image frame, this does not affect the compression level for pixel blocks in the overlapping area of the not selected video image frame. This may even accommodate a decrease of the compression level in the overlapping area of the not selected video image frame. Hence, the compression level set for pixel blocks of the overlapping areas of the not selected video image frame can be maintained as determined based on the given principle. Hence, since the overlapping area of the not selected video image frame depicts the same sub-portion of the scene as the overlapping area of the selected video image frame, the overlapping area of the not selected video image frame can be used to facilitate provision of a desired quality for the overlapping area.

The given principle may be any principle used to set a compression value for pixel blocks. By "given" is meant that the principle is predetermined, e.g., in the sense that the principle is used that is implemented in the device used in relation to the method, or in the sense that a user has selected a principle of alternative principles that are implemented in the device used in relation to the method. In other words, the given principle is the principle according to which the compression value of a block of pixels will be set as a default, i.e., unless another instruction is given in relation to the compression value for the block of pixels.

The given principle may for example be that the respective compression levels are set for pixel blocks in the selected video image frame based on a respective property or value of a property associated with the pixel blocks in the selected video image frame. Such a property may for example be a respective interest level associated with the pixel blocks in the selected video image frame.

By interest level is meant a relative level of interest or importance of different regions of the image frame. What is considered to be of relative high interest or importance and what is considered to be of relative low interest or importance will depend on the application.

In the method of the first aspect, the act of selecting a video image frame of the two video image frames may comprise selecting the video image frame of the two video image frames based on one of an image property of the respective overlapping area in each of the two video image frames, an image sensor property of each of the two image sensors, and an image content of the respective overlapping area in each of the two video image frames. By this compression levels for pixel blocks are selectively set higher in the overlapping area in the video image frame in accordance with the image property, image sensor property or image content.

The method of the first aspect may further comprise identifying one or more objects in the respective identified overlapping area in each of the two video image frames. The act of selecting a video image frame of the two video image frames may then comprise selecting the video image frame of the two video image frames in which the one or more objects is most occluded, or the object is least identifiable. By this compression levels for pixel blocks are selectively set higher in the overlapping area in the video image frame in which the one or more objects is most occluded, or the object is least identifiable in its overlapping area. This is beneficial since the overlapping area of the selected video image frame is the one that is likely least useful for at least one of identification and analysis of objects.

In the method of the first aspect, the act of selecting a video image frame of the two video image frames may comprise selecting the video image frame of the two video image frames having one or more of the following image properties in the respective overlapping area: inferior focus, lowest resolution, lowest angular resolution, lowest dynamic range, lowest light sensitivity, most motion blur, and inferior color representation. By this compression levels for pixel blocks are selectively set higher in the overlapping area in the video image frame having one or more of inferior focus, lowest resolution, lowest angular resolution, lowest dynamic range, lowest light sensitivity, most motion blur, and inferior color representation in its overlapping area. This is beneficial since the overlapping area of the selected video image frame is the one that is likely least useful, e.g., for image analysis.

In the method of the first aspect, the act of selecting a video image frame of the two video image frames may comprise selecting the video image frame of the two video image frames captured by the image sensor that has a longest distance to the sub-portion of the scene. This is beneficial since the overlapping area of the selected video image frame is the one that is likely least useful, e.g., for image analysis, since if other parameters are the same, a longer distance to the sub-portion of the scene will result in a lower resolution of the sub-portion of the scene in the overlapping area.

The method of the first aspect may further comprise identifying one or more objects in the respective identified overlapping area in each of the two video image frames. The act of selecting a video image frame of the two video image frames may the comprise selecting the video image frame of the two video image frames captured by the image sensor that has a longest distance to the identified one or more objects in the scene. This is beneficial since the overlapping area of the selected video image frame is the one that is likely least useful, e.g., for image analysis, since if other parameters are the same, a longer distance to the one or more objects will result in a lower resolution of the one or more objects in the overlapping area.

The method of the first aspect may further comprise identifying one or more objects in the respective identified overlapping area in each of the two video image frames. The act of selecting a video image frame of the two video image frames may then comprise selecting the video image frame of the two video image frames for which object classification is inferior, object identification is inferior, object pose is inferior, or re-identification vector is inferior. Inferior pose may for example mean that the object is least from the front. This is beneficial since the overlapping area of the selected video image frame is the one that is likely least useful for at least one object classification, object identification, object pose, and object re-identification.

In the act of setting compression levels, the respective compression levels for pixel blocks in the overlapping area in the selected video image frame may further be set higher than respective compression levels for pixel blocks in the overlapping area in the not selected video image frame of the two video image frames. This is beneficial since the overlapping area of the not selected video image frame is the one that is likely most useful, e.g., for image analysis.

In the act of setting compression levels, the respective compression levels for pixel blocks in the not selected video image frame may be set based on the given principle, and wherein respective compression levels for pixel blocks in the overlapping area in the not selected video image frame are selectively set lower than respective compression levels that would have been set based on the given principle, wherein the combined number of bits of the two video image frames as encoded is equal to or lower than the number of bits of the two video image frames would have been if the compression levels would have been set based only on the given principle. By maintaining equal or lower number of bits for the two video image frames, a higher quality can be achieved in the overlapping area of the not selected video image frame without increase and optionally even decrease of the number of bits for the two video image frames. This is for example beneficial when the same sub-portion of the scene depicted the overlapping areas is of particular interest.

The method of the first aspect may further comprise transmitting the two encoded video image frames to a common receiver.

According to a second aspect, a method for encoding two video image frames captured by a respective one of two image sensors is provided, wherein each of the two video image frames depicts a respective portion of a scene. The method of the second aspect comprises identifying a respective overlapping area in each of the two video image frames, which overlapping areas both depict a same sub-portion of the scene, and selecting a video image frame of the two video image frames. The method of the second aspect further comprises setting compression levels for the two image frames, wherein respective compression levels are set for pixel blocks in the selected video image frame based on a given principle, and wherein respective compression levels for pixel blocks in the overlapping area in the selected video image frame are selectively set lower than respective compression levels that would have been set based on the given principle. This is for example beneficial when the same sub-portion of the scene depicted the overlapping areas is of particular interest.

The given principle may for example be that the respective compression levels are set for pixel blocks in the selected video image frame based on a respective property value associated with the pixel blocks in the selected video image frame. Such a property may for example be a respective interest level associated with the pixel blocks in the selected video image frame.

By interest level is meant a relative level of interest or importance of different regions of the image frame. What is considered to be of relative high interest or importance and what is considered to be of relative low interest or importance will depend on the application.

The method of the second aspect may further comprises encoding the two video image frames.

In the act of setting compression levels of the method of the second aspect, respective compression levels for pixel blocks in a non-overlapping area in the selected video image frame may be selectively set higher than respective compression levels that would have been set based on the given principle, wherein the number of bits of the selected video image frame as encoded is equal to or lower than the number of bits of the selected video image frames would have been if the compression levels would have been set based only on the given principle. By maintaining equal or lower number of bits for the selected video image frames, a higher quality can be achieved in the overlapping area of the selected video image frame without increase and optionally even decrease of the number of bits for the selected video image frame. This is for example beneficial when the overlapping areas of the selected video image frame is of particular interest.

According to a third aspect, a non-transitory computer-readable storage medium is provided having stored thereon instructions for implementing the method of the first aspect or of the second aspect when executed in a system having at least two image sensors, at least one processor and at least one encoder.

The above-mentioned optional features of the method according to the first aspect, when applicable, apply to this third aspect as well.

According to a fourth aspect, an image processing device for encoding two video image frames captured by a respective one of two image sensors is provided, wherein each of the two video image frames depicts a respective portion of a scene. The image processing device comprises circuitry configured to execute an identifying function configured to identify a respective overlapping area in each of the two video image frames, which overlapping areas depict a same sub-portion of the scene, a selecting function configured to select a video image frame of the two video image frames, and a setting function configured to set compression levels for the two image frames, wherein respective compression levels are set for pixel blocks in the selected video image frame based on a given principle, and wherein respective compression levels for pixel blocks in the overlapping area in the selected video image frame are selectively set higher than respective compression levels that would have been set based on the given principle. The image processing device further comprises at least one encoder for encoding the two video image frames.

The given principle may for example be that the respective compression levels are set for pixel blocks in the selected video image frame based on a respective property value associated with the pixel blocks in the selected video image frame. Such a property may for example be a respective interest level associated with the pixel blocks in the selected video image frame.

By interest level is meant a relative level of interest or importance of different regions of the image frame. What is considered to be of relative high interest or importance and what is considered to be of relative low interest or importance will depend on the application.

The image processing device of the fourth aspect, the selecting function may further be configured to select the video image frame of the two video image frames based on one of an image property of the respective overlapping area in each of the two video image frames, an image sensor property of each of the two image sensors, and an image content of the respective overlapping area in each of the two video image frames.

In the setting function, the respective compression levels for pixel blocks in the overlapping area in the selected video image frame may further be set higher than respective compression levels for pixel blocks in the overlapping area in the not selected video image frame of the two video image frames.

In the setting function, respective compression levels may be set for pixel blocks in the not selected video image frame based on the given principle, and respective compression levels for pixel blocks in the overlapping area in the not selected video image frame may be selectively set lower than respective compression levels that would have been set based on the given principle, wherein the combined number of bits of the two video image frames as encoded is equal to or lower than the number of bits of the two video image frames would have been if the compression levels would have been set based only on the given principle.

The image processing device of the fourth aspect may further comprise a transmitter for transmitting the two encoded video image frames to a common receiver.

The above-mentioned further optional features of the method of the first aspect, when applicable, apply to this third aspect as well.

According to a fifth aspect, a camera system is provided. The camera system comprises the image processing device of the fourth aspect and the two image sensors configured to capturing a respective one of the two video image frames.

Hence, it is to be understood that this invention is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures. The figures should not be considered limiting but are instead used for explaining and understanding.

DETAILED DESCRIPTION

Figure 1:
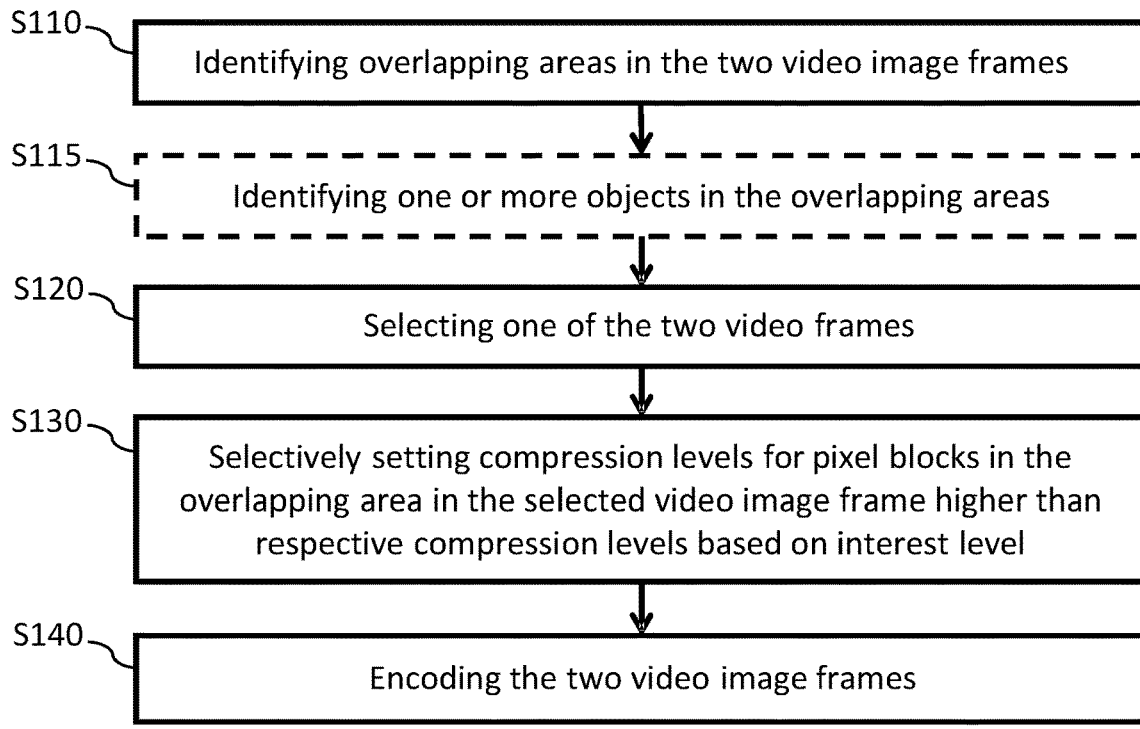
FIG. 1 shows a flow chart in relation to embodiments of a method of the present disclosure.

The present invention will now be described hereinafter with reference to the accompanying drawings, in which currently preferred embodiments of the invention are illustrated. This invention may, however, be embodied in many different forms and should not be construed as limited to the embodiments set forth herein.

The invention is applicable in scenarios in which two video image frames are captured by a respective one of two image sensors, each of the two video image frames depicts a respective portion of a scene, and each of the two video image frames comprises a respective overlapping area, which overlapping areas both depict a same sub-portion of the scene. Each of the two video image frames may for example be one of a separate sequence of video image frames. The two video image frames are to be encoded and stored and/or transmitted and hence, it is of interest to limit the number of bits to be stored and/or transmitted. At the same time, it may be important, e.g., in relation to subsequent analysis, that each portion of the video image frames still have desired quality after storing and/or transmitting. In the method of the first aspect, use is made of redundancy in the form of overlapping areas in the two video image frames and the total number of bits after encoding of the two video image frames is reduced by selectively setting the compression higher in the overlapping area in a selected one of the two video image frames. Since the overlapping area in the not selected one of the two video image frames depicts a same sub-portion of the scene, the overlapping portion of the not selection one of the two video image frames may provide a desired quality in relation to the same sub-portion of the scene. In the method of the second aspect use is made of identification of overlapping areas in the two video image frames and the quality is increased by selectively setting the compression lower in the overlapping area in a selected one of the two video image frames. The total number of bits after encoding of the two video image frames may then optionally be reduced by increasing the compression in the non-overlapping area in the selected one of the two video image frames or in the overlapping area in the not selected one of the two video image frames.

In connection with FIGS. 1 and 3A-D, embodiments of a method 100 of the first aspect for encoding two video image frames captured by a respective one of two image sensors will be discussed. Each of the two video image frames depicts a respective portion of a scene. The steps of the method 100 may be performed by the image processing device 400 described in connection with FIG. 4.

The two image sensors may be arranged in two separate cameras or in a single camera. In the former case, the two different cameras may for example be two fixed cameras arranged such that they capture two video image frames including overlapping areas depicting a same sub-portion of the scene. For example, the two cameras may be two surveillance cameras which are arranged to depict a respective portion of a scene. In the latter case the single camera may for example be arranged to capture two video image frames a same sub-portion of the scene, which two video image frames are to be used for producing panoramic video image frames by stitching the two overlapping video image frames together. Also when the sensors are arranged in two separate cameras, the two video image frames may be intended to be used for producing panoramic video image frames by stitching the two overlapping video image frames together.

The method 100 comprises identifying S110 a respective overlapping area in each of the two video image frames, which overlapping areas both depict a same sub-portion of the scene.

Figure 3A:
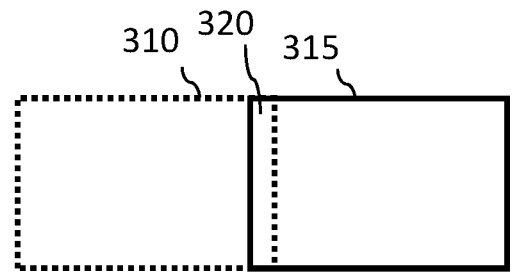
FIGS. 3A-D show schematic views in relation to overlapping areas in two video image frames.
Figure 3B:
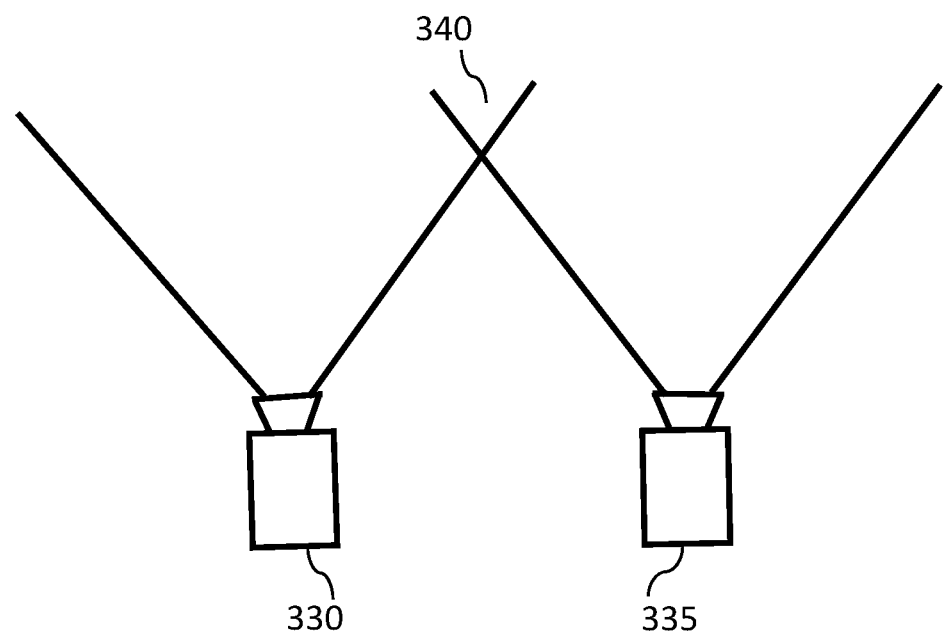
Figure 3C:
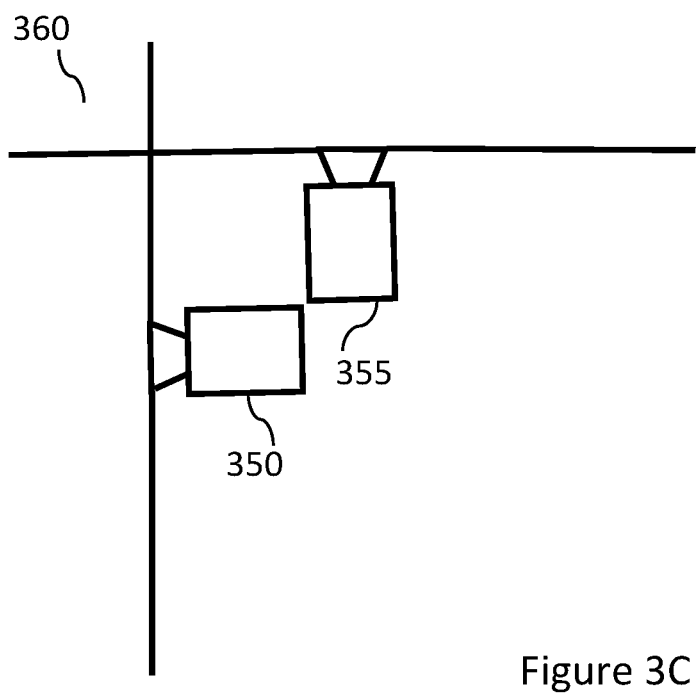
Figure 3D:
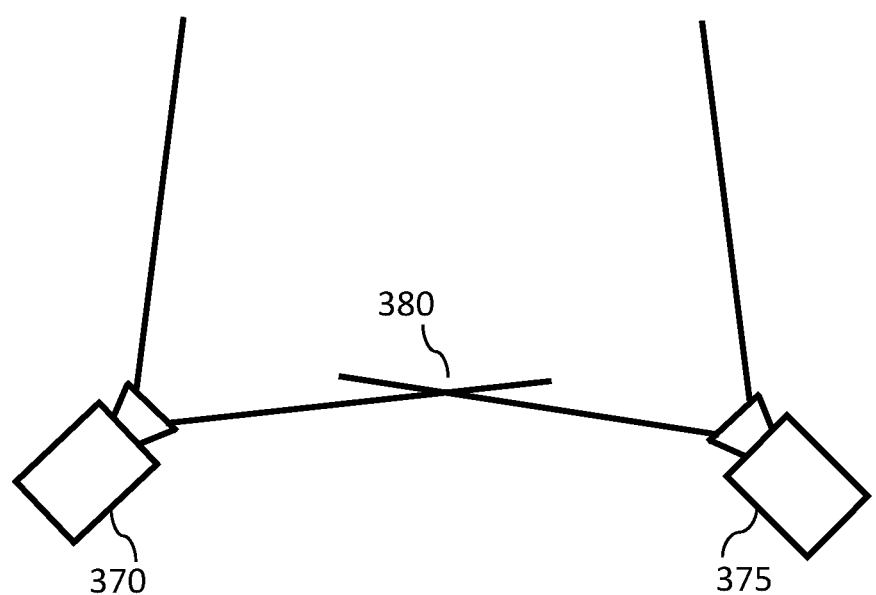

By depicting a same sub-portion of the scene is meant that the overlapping areas are each a two-dimensional representation of the same three-dimensional sub-portion of the scene. FIGS. 3A-D show schematic illustrations in relation to overlapping areas in two video image frames. In FIG. 3A, an example of a first video image frame 310 indicated by a dotted line and a second video image frame 315 indicated by a solid line. The first video image frame 310 captured by a first sensor and the second video image frame 315 captured by a second sensor each include an overlapping area 320 depicting a same sub-portion of a scene. The first image sensor may be arranged in a camera 330 and the second image sensor may be arranged in a camera 335 such that the sensors are parallel in horizontal direction as illustrated in FIG. 3B. The overlapping portion 320 resulting from the arrangement in FIG. 3B is the result of the overlap 340 between the angle of view of the first camera 330 and the angle of view of the second camera 335. In alternative to the illustration in FIG. 3B, the first image sensor and the second image sensor may be arranged in a single camera. The first image sensor may be arranged in a camera 350 and the second image sensor may be arranged in a camera 355 such that the sensors are perpendicular in horizontal direction as illustrated in FIG. 3C. The overlapping portion 320 resulting from the arrangement in FIG. 3C is the result of the overlap 360 between the horizontal angle of view of the first camera 330 and the horizontal angle of view of the second camera 335. The first and second cameras 330, 335 in FIG. 3C each has a fisheye lens having 180° horizontal angle of view. This will result in a relatively larger overlapping area 320 in relation to the arrangement in FIG. 3B having a smaller horizontal angle of view. The arrangement in FIG. 3C may be a part of an arrangement including two additional cameras each has a fisheye lens having 180° horizontal angle of view and are arranged perpendicular to each other. The two additional cameras each comprises a respective image sensor and are arranged perpendicular to a respective one of the two cameras 350, 355 of FIG. 3C. The four image sensors will thus capture video image frames which together depicts a 360° view. The first image sensor may be arranged in a camera 370 and the second image sensor may be arranged in a camera 375 such that the sensors are directed party towards each other in horizontal direction as illustrated in FIG. 3D. This may for example be the case when two cameras are arranged in two respective corners or sides of a square. The overlapping portion 380 resulting from the arrangement in FIG. 3D is the result of the overlap 348 between the angle of view of the first camera 370 and the angle of view of the second camera 375. The first image sensor and the second image sensor may be arranged at any angle to each other and each of the first video image frame 310 and the second video image frame 315 will include an overlapping portion provided the horizontal angle of view of the first camera and the horizontal angle of view of the second camera are large enough. The similarity of the overlapping areas of the two video image frames will depend on the angle to each other the first image sensor 310 and the second image sensor 315 and/or the two video image frames being subjected to different projection transformations. It is to be noted that even if in FIGS. 3B and 3C cameras are shown in relation to angle between sensors in horizontal direction only, the cameras may of course also be arranged such that the first image sensor and the second image sensor are arranged at an angle to each other in vertical direction also. The overlapping portion 320 will depend also on the angle between the first image sensor and the second image sensor and the vertical angle of view of the first image sensor and the vertical angle of view of the second image sensor.

The overlapping area in each of the two video image frames may be identified by means of real-time calculation based on a current position, orientation and focal length of each of the cameras including the two image sensors capturing the two video image frames. In alternative, if the two video image frames are captured by two image sensors arranged in cameras which each has a known mounting position, a known pan position, a known tilt position, a known vertical angle of view, and a known horizontal angle of view which are all fixed, the overlapping area in each of the two video image frames may be identified in advance. If the calculated in advance, identifying a respective overlapping area in each of the two video image frames, which overlapping areas both depict a same sub-portion of the scene, is performed once and then can be reused each subsequent time the method 100 is performed provided that the cameras are fixed mounted and not pan tilt zoom cameras. As a further alternative, the overlapping area may be determined based on image analysis of the two video image frames. For example, from object detection/tracking in the two video image frames it may be concluded that the same object is in both of the two video image frames at the same time. From this it may in turn be concluded that there is an overlap between the two video image frames and the overlapping area may be determined.

The method further comprises selecting S120 a video image frame of the two video image frames. In its broadest sense, selecting need not be based on any specific criterium as long as one of the video image frames is selected.

However, the selection may be based on one or more criteria resulting in selecting the video image frame for which the overlapping area is least suitable for a specific application, such as a surveillance application. In a surveillance application, for example, one or more criteria may be used in relation to properties that affect the possibility for image analysis.

The selection S120 may be based on an image property of the respective overlapping area in each of the two video image frames. Such image properties may for example be focus, resolution, angular resolution, dynamic range, light sensitivity, motion blur, and color representation. As according to the method 100, compression levels are selectively set S130 higher in the overlapping area of the selected video image frame, the video image frame of the two video image frames having one or more of inferior focus, lowest resolution, lowest angular resolution, lowest dynamic range, lowest light sensitivity, most motion blur, and inferior color representation in its overlapping area may be selected S120.

Alternatively or additionally, the selection S120 may be based on an image sensor property of each of the two image sensors. Such image properties may for example be resolution, dynamic range, color representation and light sensitivity. As according to the method 100, compression levels are selectively set S130 higher in the overlapping area of the selected video image frame, the video image frame of the two video image frames captured by the image sensor having one or more of lowest resolution, lowest dynamic range, inferior color representation, and lowest light sensitivity may be selected S120.

Alternatively or additionally, the selection S120 may be based on an image content of the respective overlapping area in each of the two video image frames. For example, the selection S120 may be based on one or more objects in the overlapping area in each of the two video image frames. The method 100 then further comprises identifying S115 one or more objects in the respective identified overlapping area in each of the two video image frames. As according to the method 100, compression levels are selectively set S130 higher in the overlapping area of the selected video image frame, the video image frame of the two video image frames in which the one or more objects is most occluded, in which the one or more objects is least identifiable, for which object classification is inferior, for which object identification is inferior, for which re-identification vector is inferior, or that was captured by the image sensor that has the longest distance to the identified one or more objects in the scene may be selected S120. By the re-identification vector being inferior may be meant that the re-identification vector has a shorter re-identification distance as compared to the reference vector or the re-identification vector forms a more well-separated clustering of the re-identification vectors.

Alternatively or additionally, the selection S120 may be based on a distance from each image sensor to the sub-portion of the scene. The distance from an image sensor to the sub-portion of the scene will affect the resolution with which each object is reproduced in the video image frame captured by the image sensor. As according to the method 100, compression levels are selectively set S130 higher in the overlapping area of the selected video image frame, the video image frame of the two video image frames that has the longest distance to the sub-portion of the scene may be selected S120 if higher resolution is preferred.

Once one video image frame has been selected, compression levels are set for the two image frames. Respective compression levels are set for pixel blocks in the selected video image frame based on a given principle. The given principle may be any compression principle used to set a compression value for pixel blocks. The given principle may for example be that the respective compression levels are set for pixel blocks in the selected video image frame based on a respective property or value of a property associated with the pixel blocks in the selected video image frame. Such a property may for example be a respective interest levels associated with the pixel blocks in the selected video image frame. Pixel blocks also referred to as macroblocks, coding tree units or other depending e.g., on the coding standard. The interest level or importance level may be set of each pixel block separately or for regions that each covers a plurality of pixel blocks. The interest level or importance level may be determined based on different criteria depending on the application. For video surveillance, areas with motion of a certain type, such as people moving or objects entering a scene may be considered to be of higher importance than other objects which generate constant movement, such as trees, bushes, grass, flags that move due to wind. Hence, pixel blocks relating to such objects of higher importance may have a higher interest level. Other examples that may give a pixel block a higher interest level is if it relates to a part of an object that could enable identification, e.g., face of a person, number plate of a car, etc. Example that may give a pixel block a lower interest level if it relates to a part of the image where there is very much motion causing motion blur, where the light level is too low, or to high (overexposed), which is out of focus, where the noise level is high etc. Another example that may give a pixel block a higher interest level is if it is located in an area comprising one or more detected objects or is located in a region indicated as a region of interest, e.g., based on image analytics.

Other given principles can be that compression levels are set, e.g., on a pixel block level, for the pixel blocks in the selected video image frame based on:

- a frame type (I, P, B, intra-refresh, fast forward frame, non referenced P-frames, Empty frames) of the frame the pixel blocks are in
- a probability that there is movement in the pixel block
- a probability that the pixel block is part of the background (the variation in the frequency distribution of the pixel block, i.e., not based on movement detection but on spatially based detection)
- the compression value for the pixel block in the previous frame
- the compression value of neighboring pixel blocks of the pixel block
- the number of previous frames the image data of the pixel blocks have occurred in (for a pan-tilt-zoom camera)
- the number of subsequent frames the image data of the pixel blocks are estimated to occur in (for a pan-tilt-zoom camera)
- whether a quality increase is required
- a bitrate target on short term and/or long term
- a luminance level of the pixel block
- a variance of the pixel block
- detections based on video analytics or other analytics such as radar and audio analytics
- a focus level of the pixel block
- a motion blur level of the pixel block
- a noise level of the pixel block the number of frames until the pixel block is expected to be coded as an I block In the setting of compression levels, respective compression levels for pixel blocks in the overlapping area in the selected video image frame are selectively set S130 higher than respective compression levels that would have been set based on the given principle, such as based on respective interest levels associated with the pixel blocks in the overlapping area in the selected video image frame. Hence, a reduction of the number of bits of the selected video image frame after compression will be achieved as compared to if the compression levels would all have been set based on the given principle, such as based on respective interest levels associated with the pixel blocks also in the overlapping area in the selected video image frame.

When encoding image frames divided into a plurality of pixel blocks into a video, a compression level, e.g., in the form of a compression value, is set for each pixel block. An example of such a compression value is a quantization parameter (QP) value used in the H.264 and H.265 video compression standards. The compression level may either be absolute or it may be relative. If the compression level is relative, it is indicated as a compression level offset in relation to a reference compression level. The reference compression level is a compression level that has been selected to be the reference in relation to which the reference level offset is set. The reference compression level may for example be an expected mean or median compression value over time, a maximum compression value, a minimum compression value etc. The reference compression level offset may be negative, positive or '0'. For example, offset QP values may be set in relation to a reference QP value. The setting a respective compression value higher then means selectively setting offset QP values higher. The thus set offset QP value for each pixel block may then be provided in a quantization parameter map (QMAP) used for instructing an encoder to encode the image frame using the set offset QP values according to the QMAP.

The respective compression levels for pixel blocks in the overlapping area in the selected video image frame may be set higher than respective compression levels for pixel blocks in the overlapping area in the not selected video image frame of the two video image frames.

The respective compression levels for pixel blocks in the not selected video image frame may be set based on a given principle, such as based on respective interest levels associated with the pixel blocks in the not selected video image frame. Furthermore, respective compression levels for pixel blocks in the overlapping area in the not selected video image frame may be selectively set lower than respective compression levels that would have been set based on the given principle, such as based on respective interest levels associated with the pixel blocks in the overlapping area in the not selected video image frame. The higher compression levels are selected such that the combined number of bits of the two video image frames as encoded is equal to or lower than the number of bits of the two video image frames would have been if the compression levels would have been set based only on the given principle, such as based only on respective interest levels associated with the pixel blocks in the overlapping area in the selected video image frame and in the not selected video image frame. This will result in a higher quality of the overlapping portion of the not selected video image frame than would have resulted if respective compression levels would have been set based on the given principle, such as based on respective interest levels associated with the pixel blocks in the overlapping area in the not selected video image frame. At the same time the combined number of bits of the two video image frames as encoded is not increased and possibly decreased.

The method 100 further comprises encoding the two video image frames. The two video image frames may be encoded by two separate encoders or they may be encoded by a single encoder. In the encoding the set compression levels for pixel blocks of the video image frames are used to compress the encoded video image frames.

In case the two video image frames are encoded in two separate encoders, selecting S120 one of the two video image frames may be based on properties of the two separate encoders. For example, the video image frame of the two video image frames that is to be encoded in an encoder with an inferior compression level of two encoders may be selected in the act of selecting S120. Furthermore, the video image frame of the two video image frames that is to be encoded in an encoder which does not support a desired coding standard may be selected in the act of selecting S120. The latter is relevant if the not selected video image frame is to be encoded in an encoder which does support the desired coding standard.

The method 100 may further comprise storing in a memory and/or transmitting the two encoded video image frames to a common receiver. After storing and/or transmission, the two encoded video image frames may for example be decoded and viewed and/or analyzed, e.g., at the common receiver, or they may be stitched together to form a single video image frame.

In connection with FIGS. 2 and 3A-D, embodiments of a method 200 of the second aspect for encoding two video image frames captured by a respective one of two image sensors will be discussed. Each of the two video image frames depicts a respective portion of a scene. The steps of the method 200 may be performed by the image processing device 400 described in connection with FIG. 4.

The two image sensors may be arranged in two separate cameras or in a single camera. In the former case, the two different cameras may for example be two fixed cameras arranged such that they capture two video image frames including overlapping areas depicting a same sub-portion of the scene. For example, the two cameras may be two surveillance cameras which are arranged to depict a respective portion of a scene. In the latter case the single camera may for example be arranged to capture two video image frames a same sub-portion of the scene, which two video image frames are to be used for producing panoramic video image frames by stitching the two overlapping video image frames together. Also when the sensors are arranged in two separate cameras, the two video image frames may be intended to be used for producing panoramic video image frames by stitching the two overlapping video image frames together.

The method 200 comprises identifying a respective overlapping area in each of the two video image frames, which overlapping areas both depict a same sub-portion of the scene.

By depicting a same sub-portion of the scene is meant that the overlapping areas are each a two-dimensional representation of the same three-dimensional sub-portion of the scene. FIGS. 3A-D show schematic illustrations in relation to overlapping areas in two video image frames. In FIG. 3A, an example of a first video image frame 310 indicated by a dotted line and a second video image frame 315 indicated by a solid line. The first video image frame 310 captured by a first sensor and the second video image frame 315 captured by a second sensor each include an overlapping area 320 depicting a same sub-portion of a scene. The first image sensor may be arranged in a camera 330 and the second image sensor may be arranged in a camera 335 such that the sensors are parallel in horizontal direction as illustrated in FIG. 3B. The overlapping portion 320 resulting from the arrangement in FIG. 3B is the result of the overlap 340 between the angle of view of the first camera 330 and the angle of view of the second camera 335. In alternative to the illustration in FIG. 3B, the first image sensor and the second image sensor may be arranged in a single camera. The first image sensor may be arranged in a camera 350 and the second image sensor may be arranged in a camera 355 such that the sensors are perpendicular in horizontal direction as illustrated in FIG. 3C. The overlapping portion 320 resulting from the arrangement in FIG. 3C is the result of the overlap 360 between the horizontal angle of view of the first camera 330 and the horizontal angle of view of the second camera 335. The first and second cameras 330, 335 in FIG. 3C each has a fisheye lens having 180° horizontal angle of view. This will result in a relatively larger overlapping area 320 in relation to the arrangement in FIG. 3B having a smaller horizontal angle of view. The arrangement in FIG. 3C may be a part of an arrangement including two additional cameras each has a fisheye lens having 180° horizontal angle of view and are arranged perpendicular to each other. The two additional cameras each comprises a respective image sensor and are arranged perpendicular to a respective one of the two cameras 350, 355 of FIG. 3C. The four image sensors will thus capture video image frames which together depicts a 360° view. The first image sensor may be arranged in a camera 370 and the second image sensor may be arranged in a camera 375 such that the sensors are directed party towards each other in horizontal direction as illustrated in FIG. 3D. This may for example be the case when two cameras are arranged in two respective corners or sides of a square. The overlapping portion 380 resulting from the arrangement in FIG. 3D is the result of the overlap 348 between the angle of view of the first camera 370 and the angle of view of the second camera 375. The first image sensor and the second image sensor may be arranged at any angle to each other and each of the first video image frame 310 and the second video image frame 315 will include an overlapping portion provided the horizontal angle of view of the first camera and the horizontal angle of view of the second camera are large enough. The similarity of the overlapping areas of the two video image frames will depend on the angle to each other the first image sensor 310 and the second image sensor 315 and/or the two video image frames being subjected to different projection transformations. It is to be noted that even if in FIGS. 3B and 3C cameras are shown in relation to angle between sensors in horizontal direction only, the cameras may of course also be arranged such that the first image sensor and the second image sensor are arranged at an angle to each other in vertical direction also. The overlapping portion 320 will depend also on the angle between the first image sensor and the second image sensor and the vertical angle of view of the first image sensor and the vertical angle of view of the second image sensor.

The overlapping area in each of the two video image frames may be identified by means of real-time calculation based on a current position, orientation and focal length of each of the cameras including the two image sensor capturing the two video image frames. In alternative, if the two video image frames are captured by two image sensors arranged in cameras which each has a known mounting position, a known pan position, a known tilt position, a known vertical angle of view, and a known horizontal angle of view which are all fixed, the overlapping area in each of the two video image frames may be identified in advance. If the calculated in advance, identifying a respective overlapping area in each of the two video image frames, which overlapping areas both depict a same sub-portion of the scene, is performed once and then can be reused each subsequent time the method 100 is performed provided that the cameras are fixed mounted and not pan tilt zoom cameras. As a further alternative, the overlapping area may be determined based on image analysis of the two video image frames. For example, from object detection/tracking in the two video image frames it may be concluded that the same object is in both of the two video image frames at the same time. From this it may in turn be concluded that there is an overlap between the two video image frames and the overlapping area may be determined.

The method 200 further comprises selecting S220 a video image frame of the two video image frames. In its broadest sense, selecting need not be based on any specific criterion as long as one of the video image frames is selected.

However, the selection may be based on one or more criteria resulting in selecting the video image frame for which the overlapping area is most suitable for a specific application, such as a surveillance application. In a surveillance application, for example, one or more criteria may be used in relation to properties that affect the possibility for image analysis.

The selection S220 may be based on an image property of the respective overlapping area in each of the two video image frames. Such image properties may for example be focus, resolution, angular resolution, dynamic range, light sensitivity, motion blur, and color representation. As according to the method 200, compression levels are selectively set S230 lower in the overlapping area of the selected video image frame, the video image frame of the two video image frames having one or more of superior focus, highest resolution, highest angular resolution, highest dynamic range, highest light sensitivity, least motion blur, and superior color representation in its overlapping area may be selected S220.

Alternatively or additionally, the selection S220 may be based on an image sensor property of each of the two image sensors. Such image properties may for example be resolution, dynamic range, color representation and light sensitivity. As according to the method 200, compression levels are selectively set S230 lower in the overlapping area of the selected video image frame, the video image frame of the two video image frames captured by the image sensor having one or more of highest resolution, highest dynamic range, superior color representation, and highest light sensitivity may be selected S220.

Alternatively or additionally, the selection S220 may be based on an image content of the respective overlapping area in each of the two video image frames. For example, the selection S220 may be based on one or more objects in the overlapping area in each of the two video image frames. The method 200 then further comprises identifying S215 one or more objects in the respective identified overlapping area in each of the two video image frames. As according to the method 200, compression levels are selectively set S230 lower in the overlapping area of the selected video image frame, the video image frame of the two video image frames in which the one or more objects is most occluded, in which the one or more objects is least identifiable, for which object classification is inferior, for which object identification is superior, for which re-identification vector is superior, or that was captured by the image sensor that has the shortest distance to the identified one or more objects in the scene may be selected S220. By the re-identification vector being superior may be meant that the re-identification vector has a longer re-identification distance as compared to the reference vector or the re-identification vector forms a less well-separated clustering of the re-identification vectors.

Alternatively or additionally, the selection S220 may be based on a distance from each image sensor to the sub-portion of the scene. The distance from an image sensor to the sub-portion of the scene will affect the resolution with which each object is reproduced in the video image frame captured by the image sensor. As according to the method 200, compression levels are selectively set S230 lower in the overlapping area of the selected video image frame, the video image frame of the two video image frames that has the shortest distance to the sub-portion of the scene may be selected S220 if higher resolution is preferred.

Once one video image frame has been selected, compression levels are set for the two image frames. Respective compression levels are set for pixel blocks in the selected video image frame based on a given principle. The given principle may for example be that the respective compression levels are set for pixel blocks in the selected video image frame based on a respective property or value of a property associated with the pixel blocks in the selected video image frame. Such a property may for example be a respective interest levels associated with the pixel blocks in the selected video image frame. Pixel blocks may also be referred to as macroblocks, coding tree units or other depending e.g., on the coding standard. The interest level or importance level may be set of each pixel block separately or for regions that each covers a plurality of pixel blocks. The interest level or importance level may be determined based on different criteria depending on the application. For video surveillance, areas with motion of a certain type, such as people moving or objects entering a scene may be considered to be of higher importance than other objects which generate constant movement, such as trees, bushes, grass, flags that move due to wind. Hence, pixel blocks relating to such objects of higher importance may have a higher interest level. Other examples that may give a pixel block a higher interest level is if it relates to a part of an object that could enable identification, e.g., face of a person, number plate of a car, etc. Example that may give a pixel block a lower interest level if it relates to a part of the image where there is very much motion causing motion blur, where the light level is too low, or to high (overexposed), which is out of focus, where the noise level is high etc.

In the setting of compression levels, respective compression levels for pixel blocks in the overlapping area in the selected video image frame are selectively set S230 lower (as opposed to higher in the method 100) than respective compression levels that would have been set based on the given principle, such as based on respective interest levels associated with the pixel blocks in the overlapping area in the selected video image frame. Hence, in the method 200, an increase of quality of the overlapping area of the selected video image frame after compression will be achieved as compared to if the compression levels would all have been set based on the given principle, such as based on respective interest levels associated with the pixel blocks also in the overlapping area in the selected video image frame.

When encoding image frames divided into a plurality of pixel blocks into a video, a compression level, e.g., in the form of a compression value, is set for each pixel block. An example of such a compression value is a quantization parameter (QP) value used in the H.264 and H.265 video compression standards. The compression level may either be absolute or it may be relative. If the compression level is relative, it is indicated as a compression level offset in relation to a reference compression level. The reference compression level is a compression level that has been selected to be the reference in relation to which the reference level offset is set. The reference compression level may for example be an expected mean or median compression value over time, a maximum compression value, a minimum compression value etc. The reference compression level offset may be negative, positive or '0'. For example, offset QP values may be set in relation to a reference QP value. The setting a respective compression value higher then means selectively setting offset QP values higher. The thus set offset QP value for each pixel block may then be provided in a quantization parameter map (QMAP) used for instructing an encoder to encode the image frame using the set offset QP values according to the QMAP.

The respective compression levels for pixel blocks in a non-overlapping area in the selected video image frame may be selectively set higher than respective compression levels that would have been set based on the given principle, such as based on respective interest levels associated with the pixel blocks in the non-overlapping area in the selected video image frame. The higher compression levels are selected such that the number of bits of the selected video image frame as encoded is equal to or lower than the number of bits of the selected video image frames would have been if the compression levels would have been set based only on the given principle, such as based only on respective interest levels associated with the pixel blocks in the non-overlapping area and the overlapping area in the selected video image frame. The combined number of bits of the selected video image frame as encoded is thus not increased and possibly decreased.

The method 200 further comprises encoding the two video image frames. The two video image frames may be encoded by two separate encoders or they may be encoded by a single encoder.

In connection with FIG. 4, embodiments of an image processing device 400 for encoding two video image frames captured by a respective one of two image sensors of the fourth aspect and embodiments of a camera system 450 of the fifth aspect will be discussed. Each of the two video image frames depicts a respective portion of a scene. The steps of the method 100 may be performed by the image processing device 400 described in connection with FIG. 4.

The image processing device 400 comprises an encoder 410 and a circuitry 420. The circuitry 420 is configured to carry out functions of the image processing device 400. The circuitry 420 may include a processor 422, such as a central processing unit (CPU), microcontroller, or microprocessor. The processor 422 is configured to execute program code. The program code may for example be configured to carry out the functions of the image processing device 400.

The image processing device 400 may further comprise a memory 430. The memory 430 may be one or more of a buffer, a flash memory, a hard drive, a removable media, a volatile memory, a non-volatile memory, a random access memory (RAM), or another suitable device. In a typical arrangement, the memory 430 may include a non-volatile memory for long term data storage and a volatile memory that functions as device memory for the circuitry 420. The memory 430 may exchange data with the circuitry 420 over a data bus. Accompanying control lines and an address bus between the memory 430 and the circuitry 420 also may be present.

Functions of the image processing device 400 may be embodied in the form of executable logic routines (e.g., lines of code, software programs, etc.) that are stored on a non-transitory computer readable medium (e.g., the memory 430) of the image processing device 400 and are executed by the circuitry 420 (e.g., using the processor 422). Furthermore, the functions of the image processing device 400 may be a stand-alone software application or form a part of a software application that carries out additional tasks related to the image processing device 400. The described functions may be considered a method that a processing unit, e.g., the processor 422 of the circuitry 420 is configured to carry out. Also, while the described functions may be implemented in software, such functionality may as well be carried out via dedicated hardware or firmware, or some combination of hardware, firmware and/or software.

The encoder 410 may for example be adapted to encode according to H.264 or H.265 video compression standard.

The circuitry 420 is configured to execute an identifying function 442, a selecting function 444, and a setting function 446.

The identifying function 442 is configured to identify a respective overlapping area in each of the two video image frames, which overlapping areas depict a same sub-portion of the scene.

The selecting function 444 is configured to select a video image frame of the two video image frames.

The setting function 446 is configured to set compression levels for the two image frames, wherein respective compression levels are set for pixel blocks in the selected video image frame based on a given principle. The given principle may for example be that the respective compression levels are set for pixel blocks in the selected video image frame based on a respective property or value of a property associated with the pixel blocks in the selected video image frame. Such a property may for example be a respective interest levels associated with the pixel blocks in the selected video image frame. Respective compression levels for pixel blocks in the overlapping area in the selected video image frame are selectively set higher than respective compression levels that would have been set based on the given principle, such as based on respective interest levels associated with the pixel blocks in the overlapping area in the selected video image frame.

The at least one encoder 410 is configured for encoding the two video image frames.

The functions carried out by the circuitry 420 may be further adapted as the corresponding steps of the embodiments of the methods described in relation to FIGS. 1, 2 and 3A-D.

Figure 2:
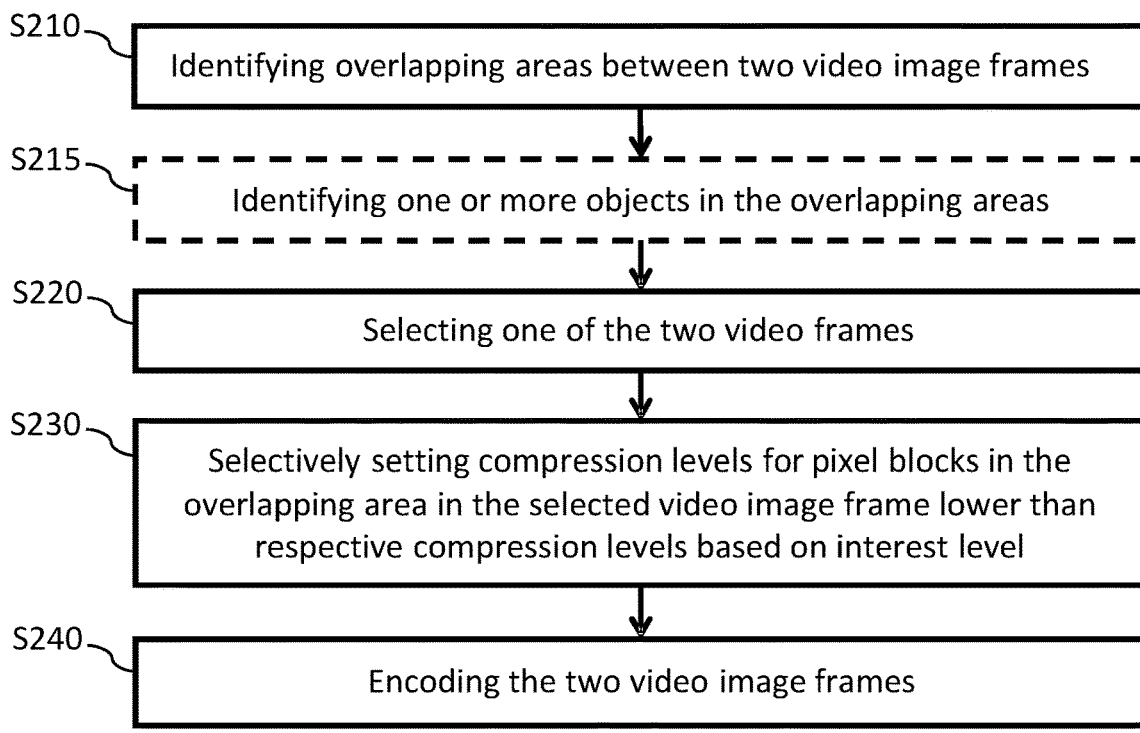
FIG. 2 shows a flow chart in relation to embodiments of another method of the present disclosure.

Specifically, the setting function 446 may be configured to setting compression levels for the two image frames, wherein respective compression levels are set for pixel blocks in the selected video image frame based on the given principle, such as based on respective interest levels associated with the pixel blocks in the selected video image frame, and wherein respective compression levels for pixel blocks in the overlapping area in the selected video image frame are selectively set lower than respective compression levels that would have been set based on the given principle, such as based on respective interest levels associated with the pixel blocks in the overlapping area in the selected video image frame for performing the method 200 described in connection with FIG. 2.

The image processing device may optionally be arranged in the camera system 450 comprising the image processing device 400 and the two image sensors 460, 470 configured to capturing a respective one of the two video image frames.

Figure 4:
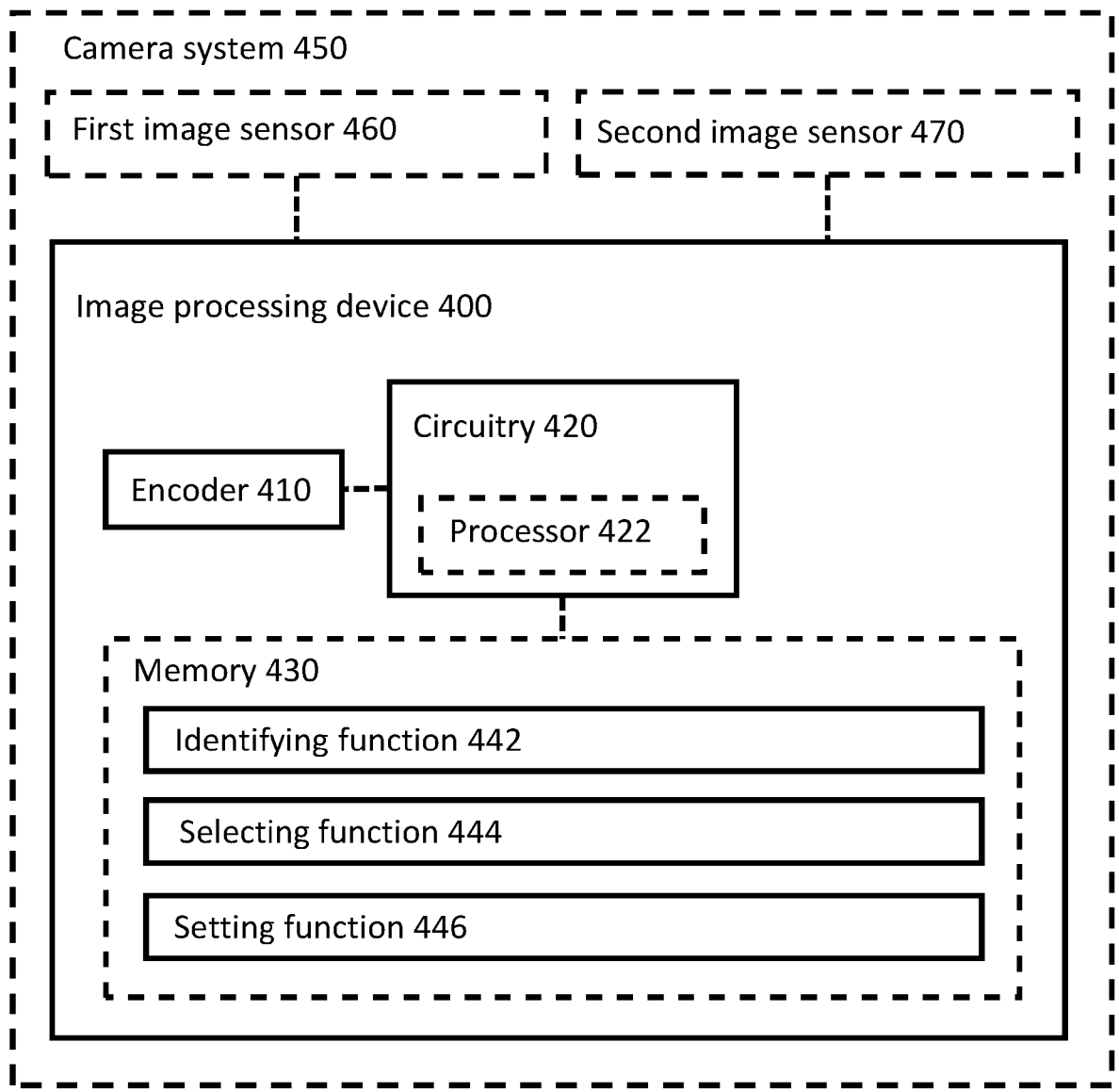
FIG. 4 shows a schematic diagram in relation to embodiments of an image processing device of the present disclosure as optionally included in a camera system of the present disclosure.

It is to be noted that even if FIG. 4 depicts the camera system 450 as including only one image processing device 400, in alternative, the camera system 450 may include two image processing devices 400, each processing a separate one of the two video image frames captured by a respective one of the first image sensor 460 and the second image sensor 470.

A person skilled in the art realizes that the present invention is not limited to the embodiments described above. On the contrary, many modifications and variations are possible within the scope of the appended claims. Such modifications and variations can be understood and effected by a skilled person in practicing the claimed invention, from a study of the drawings, the disclosure, and the appended claims.

The invention claimed is:

1. A method for encoding two video image frames captured by a respective one of two image sensors, wherein each of the two video image frames depicts a respective portion of a scene, the method comprising:
   identifying a respective overlapping area in each of the two video image frames, which overlapping areas both depict a same sub-portion of the scene;
   selecting a video image frame of the two video image frames;
   setting compression values for the two image frames, wherein respective compression values are set for pixel blocks in the selected video image frame based on a respective interest level associated with the pixel blocks in the selected video image frame, and wherein respective compression values for pixel blocks in the overlapping area in the selected video image frame are selectively set higher than respective compression values that would have been set for the pixel blocks in the overlapping area based on the respective interest level associated with the pixel blocks in the overlapping area, and
   wherein respective compression values for pixel blocks in the overlapping area in the unselected video image frame are selectively set lower than, or kept the same as, respective compression values that would have been set based on the respective interest level associated with the pixel blocks in the overlapping area; and
   encoding the two video image frames.

2. The method of claim 1, wherein selecting a video image frame of the two video image frames comprises:
   selecting the video image frame of the two video image frames based on one of an image property of the respective overlapping area in each of the two video image frames, an image sensor property of each of the two image sensors, or an image content of the respective overlapping area in each of the two video image frames.

3. The method of claim 1, further comprising:
   identifying one or more objects in the respective identified overlapping area in each of the two video image frames, and
   wherein selecting a video image frame of the two video image frames comprises:
   selecting the video image frame of the two video image frames in which the one or more objects is most occluded, or the object is least identifiable.

4. The method of claim 1, wherein selecting a video image frame of the two video image frames comprises:

selecting the video image frame of the two video image frames having one or more of the following image properties in the respective overlapping area:
inferior focus;
lowest resolution;
lowest angular resolution;
lowest dynamic range;
lowest light sensitivity;
most motion blur; and
inferior color representation.

5. The method of claim 1, wherein selecting a video image frame of the two video image frames comprises:
selecting the video image frame of the two video image frames captured by the image sensor that has a longest distance to the sub-portion of the scene.

6. The method of claim 1, further comprising:
identifying one or more objects in the respective identified overlapping area in each of the two video image frames, and
wherein selecting a video image frame of the two video image frames comprises:
selecting the video image frame of the two video image frames captured by the image sensor that has a longest distance to the identified one or more objects in the scene.

7. The method of claim 1, further comprising:
identifying one or more objects in the respective identified overlapping area in each of the two video image frames, and
wherein selecting a video image frame of the two video image frames comprises:
selecting the video image frame of the two video image frames for which object classification is inferior, object identification is inferior, or re-identification vector is inferior.

8. The method of claim 1, wherein, in setting compression values, the respective compression values for pixel blocks in the overlapping area in the selected video image frame are further set higher than respective compression values for pixel blocks in the overlapping area in the unselected video image frame of the two video image frames.

9. The method of claim 1, wherein, in setting compression values, respective compression values are set for pixel blocks in the unselected video image frame based on a respective interest level associated with the pixel blocks in the overlapping area, wherein the combined number of bits of the two video image frames as encoded is equal to or lower than the number of bits of the two video image frames would have been if the compression values would have been set for the pixel blocks in the overlapping area based only on the respective interest level associated with the pixel blocks in the overlapping area.

10. The method of claim 1, further comprising:
transmitting the two encoded video image frames to a common receiver.

11. A non-transitory computer-readable storage medium having stored thereon instructions for implementing a method when executed in a device having at least one processor and at least one encoder, the method for encoding two video image frames captured by a respective one of two image sensors, wherein each of the two video image frames depicts a respective portion of a scene, the method comprising:
identifying a respective overlapping area in each of the two video image frames, which overlapping areas both depict a same sub-portion of the scene;
selecting a video image frame of the two video image frames;
setting compression values for the two image frames, wherein respective compression values are set for pixel blocks in the selected video image frame based on a respective interest level associated with the pixel blocks in the selected video image frame, and wherein respective compression values for pixel blocks in the overlapping area in the selected video image frame are selectively set higher than respective compression values that would have been set for the pixel blocks in the overlapping area based on the respective interest level associated with the pixel blocks in the overlapping area, and
wherein respective compression values for pixel blocks in the overlapping area in the unselected video image frame are selectively set lower than, or kept the same as, respective compression values that would have been set based on the respective interest level associated with the pixel blocks in the overlapping area; and
encoding the two video image frames.

12. An image processing device for encoding two video image frames captured by a respective one of two image sensors, wherein each of the two video image frames depicts a respective portion of a scene, the image processing device comprising:
circuitry configured to execute:
an identifying function configured to identify a respective overlapping area in each of the two video image frames, which overlapping areas depict a same sub-portion of the scene,
a selecting function configured to select a video image frame of the two video image frames, and
a setting function configured to set compression values for the two image frames, wherein respective compression values are set for pixel blocks in the selected video image frame based on a respective interest level associated with the pixel blocks in the overlapping area, and wherein respective compression values for pixel blocks in the overlapping area in the selected video image frame are selectively set higher than respective compression values that would have been set for the pixel blocks in the overlapping area based on the respective interest level associated with the pixel blocks in the overlapping area, and
wherein respective compression values for pixel blocks in the overlapping area in the unselected video image frame are selectively set lower than, or kept the same as, respective compression values that would have been set based on the respective interest level associated with the pixel blocks in the overlapping area; and
at least one encoder for encoding the two video image frames.

13. A camera system comprising:
an image processing device for encoding two video image frames captured by a respective one of two image sensors, wherein each of the two video image frames depicts a respective portion of a scene, the image processing device comprising:
circuitry configured to execute:
an identifying function configured to identify a respective overlapping area in each of the two video image frames, which overlapping areas depict a same sub-portion of the scene, a selecting function configured to select a video image frame of the two video image frames, and a setting function configured to set compression values for the two image frames, wherein respective compression values are set for pixel blocks in the selected video image frame based on a respective interest level associated with the pixel blocks in the overlapping area, and wherein respective compression values for pixel blocks in the overlapping area in the selected video image frame are selectively set higher than respective compression values that would have been set for the pixel blocks in the overlapping area based on the respective interest level associated with the pixel blocks in the overlapping area, and wherein respective compression values for pixel blocks in the overlapping area in the unselected video image frame are selectively set lower than, or kept the same as, respective compression values that would have been set based on the respective interest level associated with the pixel blocks in the overlapping area; and at least one encoder for encoding the two video image frames; and the two image sensors configured to capturing a respective one of the two video image frames.

* * * * *